United States Patent
Hall et al.

(10) Patent No.: US 8,810,729 B2
(45) Date of Patent: Aug. 19, 2014

(54) METHOD AND APPARATUS FOR AUTOMATIC COMPENSATION OF SIGNAL LOSSES FROM TRANSMISSION OVER CONDUCTORS

(71) Applicant: RGB Systems, Inc., Anaheim, CA (US)

(72) Inventors: Raymond William Hall, Riverside, CA (US); Donald E Parreco, Covina, CA (US)

(73) Assignee: RGB Systems, Inc., Anaheim, CA (US)

( * ) Notice: Subject to any disclaimer, the term of this patent is extended or adjusted under 35 U.S.C. 154(b) by 0 days.

(21) Appl. No.: 13/711,430

(22) Filed: Dec. 11, 2012

(65) Prior Publication Data

US 2014/0055680 A1    Feb. 27, 2014

(51) Int. Cl.
*H04N 9/74* (2006.01)
*H04N 9/72* (2006.01)
*H04N 5/38* (2006.01)
*H03G 11/04* (2006.01)
*H04B 3/04* (2006.01)

(52) U.S. Cl.
USPC ........... 348/588; 348/692; 348/723; 725/149; 333/17.1; 333/18

(58) Field of Classification Search
None
See application file for complete search history.

(56) References Cited

U.S. PATENT DOCUMENTS

| | | | | |
|---|---|---|---|---|
| 4,459,698 A * | 7/1984 | Yumoto et al. | ................ | 375/236 |
| 5,257,286 A * | 10/1993 | Ray | ............................. | 375/230 |
| 5,343,236 A * | 8/1994 | Koppe et al. | .................. | 725/149 |
| 6,538,508 B2 * | 3/2003 | Cheung et al. | .................. | 330/86 |
| 6,618,774 B1 * | 9/2003 | Dickens et al. | ................. | 710/64 |
| 6,696,892 B1 * | 2/2004 | Behzad | ............................ | 330/51 |
| 7,047,556 B2 * | 5/2006 | Cole et al. | ..................... | 725/149 |
| 7,634,244 B2 * | 12/2009 | Burns et al. | ................. | 455/240.1 |
| 2003/0034843 A1 * | 2/2003 | Fanous et al. | ................. | 330/254 |
| 2007/0008032 A1 * | 1/2007 | Kyu et al. | ....................... | 330/51 |

* cited by examiner

*Primary Examiner* — Jefferey Harold
*Assistant Examiner* — Sean Haiem
(74) *Attorney, Agent, or Firm* — The Hecker Law Group, PLC

(57) ABSTRACT

A method and apparatus for automatic compensation of insertion loss in signals transmitted over conductors is presented. The present invention is particularly applicable to the transmission of signals over long lengths of CAT-5 or similar twisted-pair cables. A reference signal having a known form and strength (e.g. a pulse signal) is provided to each pair of conductors carrying a component of a signal from a transmitter to a receiver. The receiver includes adjustable gain amplifiers for each conductor pair over which a component of the signal is transmitted. The gains of the amplifiers are initially set at an initial level (e.g., their maximum gain) to allow detection of the reference signal. Once the reference signal is detected in a conductor pair, the amplifier gains are adjusted such that the level of the reference signal is restored approximately to its original form and strength.

20 Claims, 10 Drawing Sheets

| Pin | RGBHV | RGBS | RsGsBs | RGsB | Component | S-Video | Composite |
|---|---|---|---|---|---|---|---|
| 1 | Red/V Sync + | Red + | Red/Sync + | Red + | R-Y + | | |
| 2 | Red/V Sync - | Red - | Red/Sync - | Red - | R-Y - | | |
| 3 | Digital/Power + | Digital/Power + | Digital/Power + | Digital/Power + | Digital/Power + | Digital/Power + | Digital/Power + |
| 4 | Green + | Green + | Green/Sync + | Green/Sync + | Y + | Y + | Video + |
| 5 | Green - | Green - | Green/Sync - | Green/Sync - | Y - | Y - | Video - |
| 6 | Digital/Power - | Digital/Power - | Digital/Power - | Digital/Power - | Digital/Power - | Digital/Power - | Digital/Power - |
| 7 | Blue/H Sync + | Blue/C Sync + | Blue/Sync + | Blue + | B-Y + | C + | |
| 8 | Blue/H Sync - | Blue/C Sync - | Blue/Sync - | Blue - | B-Y - | C - | |

FIG. 2

| Pin | Signals |
|---|---|
| 1 | Composite Video + |
| 2 | Composite Video - |
| 3 | Digital/Power + |
| 4 | Y + |
| 5 | Y - |
| 6 | Digital/Power - |
| 7 | C + |
| 8 | C - |

FIG. 3

METHOD AND APPARATUS FOR AUTOMATIC COMPENSATION OF SIGNAL LOSSES FROM TRANSMISSION OVER CONDUCTORS

CROSS-REFERENCE TO RELATED APPLICATIONS

This application is a continuation of U.S. patent application Ser. No. 11/309,122, filed on Jun. 23, 2006, which is incorporated in its entirety by reference herein.

FIELD OF THE INVENTION

This invention relates to the field of video transmission. More specifically the invention relates to compensation for losses in video signals transmitted over conductors, including twisted pair conductors.

BACKGROUND OF THE INVENTION

Conductors (i.e. cables) are one method commonly used to convey electronic video signals from a source device (e.g., a video camera or a DVD player) to a destination device (e.g., a video display screen). Two types of cable commonly used for video transmission are coaxial cable and twisted pair cable. It is desirable for the video signal at the destination device to correspond accurately to the original video signal transmitted by the source device. "Insertion loss" is a term used to describe signal degradation that occurs when a video or other signal is transmitted over a transmission medium such as a cable.

Typically, insertion loss is a function of the cable length: longer length transmission cables will exhibit greater loss than shorter length cables. Coaxial cables typically exhibit less insertion loss than twisted pair cables. However, coaxial cables are more expensive and difficult to install than twisted pair cables. Twisted pair cables typically are manufactured as bundles of several twisted pairs. For example, a common form of twisted pair cable known as "Category 5" or "CAT5" cable comprises four separate twisted pairs encased in a single cable. CAT5 cable is typically terminated with an eight-pin RJ45 connector.

Insertion loss is typically caused by the physical characteristics of the transmission cable. Insertion loss includes resistive losses (also sometimes referred to as DC losses) as well as inductive, capacitive and skin effect losses (also sometimes referred to as AC losses). The AC insertion loss exhibited by a cable is frequency dependent. For example, the insertion loss for a 1500 foot length of CAT5 cable as a function of frequency is shown in FIG. 11. In the example of FIG. 11, the insertion loss generally increases with increasing frequency, with the insertion loss for high frequency signals being significantly greater (−70 dB at 50 MHz for a 1500 feet CAT-5 cable) than the DC insertion loss of 2.6 dB for 1500 Feet (e.g. the loss at a frequency value of zero).

Video signals come in a variety of formats. Examples are Composite Video, S-Video, and YUV. Each format uses a color model for representing color information and a signal specification defining characteristics of the signals used to transmit the video information. For example, the "RGB" color model divides a color into red (R), green (G) and blue (B) components and transmits a separate signal for each color component.

In addition to color information, the video signal may also comprise horizontal and vertical sync information needed at the destination device to properly display the transmitted video signal. The horizontal and vertical sync signals may be transmitted over separate conductors than the video component signals. Alternatively, the sync signals may be combined with one or more of the video signal components and transmitted along with those components.

For RGB video, several different formats exist for conveying horizontal and vertical sync information. These include RGBHV, RGBS, RGsB, and RsGsBs. In RGBHV, the horizontal and vertical sync signals are each carried on separate conductors. Thus, five conductors are used: one for each of the red component, the green component, the blue component, the horizontal sync signal, and the vertical sync signal. In RGBS, the horizontal and vertical sync signals are combined into a composite sync signal and sent on a single conductor. In RGsB, the composite sync signal is combined with the green component. This combination is possible because the sync signals comprise pulses that are sent during a blanking interval, when no video signals are present. In RsGsBs, the composite sync signal is combined with each of the red, green and blue components. Prior art devices exist for converting from one format of RGB to another. To reduce cabling requirements, for transmission of RGB video over anything other than short distances, a format in which the sync signals are combined with one or more of the color component signals is commonly used.

Although twisted pair cables are convenient and economical for transmission of video signals, signal degradation (skew between video signal components and insertion loss) limits the distance over which satisfactory quality video signals can be transmitted via twisted pair cables. Video transmitter/receiver systems exist that amplify video signals transmitted over twisted-pair cables. In such systems, a transmitter amplifies the video source signal prior to being transmitted over twisted pair cable, and a receiver amplifies the received signal. These transmitter/receiver systems allow longer transmission distances over twisted-pair cable than are possible for unamplified signals. However, to prevent signal distortion, the amount of gain (amplification) supplied by the transmitter and receiver must be properly matched to the amount of insertion loss that occurs in the length of the twisted-pair cable over which the video signal is transmitted. If the gain applied it is too high, clipping will occur. If the gain is too low, low-level portions of the original input signal may be lost. Ideally the system gain should be flat across the frequency spectrum. High frequency loss results in smearing and loss of focus in the video.

There exists a need for a video transmission system that automatically compensates for signal losses that occur for video signals transmitted over appreciable distances via conductors, including twisted pair cables.

SUMMARY OF THE INVENTION

The invention comprises a method and apparatus for automatic compensation of insertion loss in video signals transmitted over conductors. The present invention is particularly applicable to the transmission of video over long lengths of CAT-5 or similar twisted-pair cables. Embodiments of the invention may be implemented as a separate device and/or as part of a video transmission system.

In one or more embodiments, a reference signal having a known form and strength (e.g. a pulse signal) is provided to each pair of conductors carrying a component of a video signal from a transmitter to a receiver. The reference signal, for instance, comprise a modified or altered form of a sync signal of the input video signal (e.g. the horizontal or vertical sync signals). The receiver includes adjustable gain amplifiers for each conductor pair over which a component of the video signal is transmitted. The gains of the amplifiers are initially set at an initial level (e.g., their maximum gain) to allow detection of the reference signal in each pair of conductors. Once the reference signal is detected in a conductor pair, the amplifier gains are adjusted such that the level of the reference signal is restored approximately to its original value. In one or more embodiments, the amplifiers are configured to exhibit a frequency response that is the inverse to and compensates for the frequency response loss in the cable over which the video signal is being transmitted.

Further objects, features, and advantages of the present invention over the prior art will become apparent from the detailed description of the drawings which follows, when considered with the attached figures.

BRIEF DESCRIPTION OF THE DRAWINGS

FIG. 2 is an illustration of allocation of the conductors of twisted pair cable 106 for various video formats in accordance with an embodiment of the present invention.

FIG. 3 is an illustration of allocation of the conductors of twisted pair cable 106 for Video in accordance with an embodiment of the present invention.

DETAILED DESCRIPTION OF THE INVENTION

The invention comprises a method and apparatus for compensation of insertion loss in video signals transmitted over conductors, such as twisted pair cable. In the following description, numerous specific details are set forth to provide a thorough description of the invention. It will be apparent, however, to one skilled in the art, that the invention may be practiced without these specific details. In other instances, well-known features have not been described in detail so as not to obscure the invention.

In one or more embodiments, the invention comprises a transmitter and a receiver that enable communication of video signals, e.g. composite video, S-Video, computer-video, and other high resolution video, over extended distances of conductors, including, for example CAT 5 or similar twisted-pair cables.

In one or more embodiments, restoration of the video signal received by the receiver is accomplished using a reference signal. In one or more embodiments, the reference signal is a periodic pulse signal added by the transmitter to the video signal during blanking intervals of the video signal. In one or more embodiments, a modified (standardized) horizontal or vertical sync signal generated from the input video signal is used as the reference signal. The reference signal is added by the transmitter to each video component signal. When the receiver is coupled to the transmitter via a cable, the receiver initially detects the presence of the reference signal in the video component signals. In one or more embodiments, the receiver includes variable gain amplifiers for each signal component that are adjusted to an initial level for detection of the signal. In one or more embodiments, the initial level is the maximum gain of the amplifiers. In these embodiments, the amplifier gain for a video signal component remains at its maximum until the presence of the reference signal in that signal component has been detected. Once the reference signal is detected, the amplifier gains are adjusted until the reference signal is restored to a desired level, for example, the level of the original reference signal. In one or more embodiments, the amplifiers are configured to exhibit a frequency response that is the inverse to and compensates for the frequency response loss due to the cable over which the video signal is being transmitted.

Figure 1:
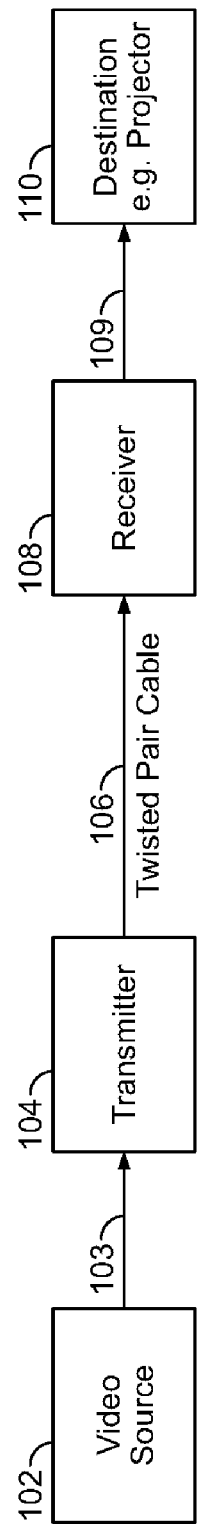
FIG. 1 is an illustration of long distance twisted pair transmission apparatus in accordance with an embodiment of the present invention.

An embodiment of a video transmission system that implements the present invention is illustrated in FIG. 1. The video transmission system of FIG. 1 comprises video source 102, cable 103, transmitter 104; twisted pair cable 106; receiver 108, cable 109 and destination device 110. Cable 103 couples the video (and audio, if applicable) signals from source 102 to transmitter 104. Cable 103 may comprise any suitable conductors known in the art for coupling the type of video signal generated by video source 102 to transmitter 104. Transmitter 104 comprises multiple input terminals for accepting different input signal formats. For example, transmitter 104 may comprise connectors for accepting a composite video signal, an S-Video signal, a digital video signal, an RGB component video signal, etc. Transmitter 104 may also comprise standard audio connectors such as, for example RCA input jacks.

In one or more embodiments, cable 106 comprises a cable comprising a bundle of multiple twisted pair conductors. For example, cable 106 may comprise a CAT5 or similar cable comprising four pairs of twisted conductors and terminated with standard male RJ-45 connectors that mate with matching female RJ-45 connectors on the transmitter and receiver, respectively. The pairs of twisted conductors may, for example, be allocated as shown in FIGS. 2 and 3.

Example embodiments of the present invention are described using RGBHV as an example video input signal format and CAT5 cable as an example conductor over which the video signal is transmitted. However, it will be clear to those of skill in the art that the invention is not limited to RGBHV and CAT5 cable and other video formats and other cable types may be used.

Figure 4:
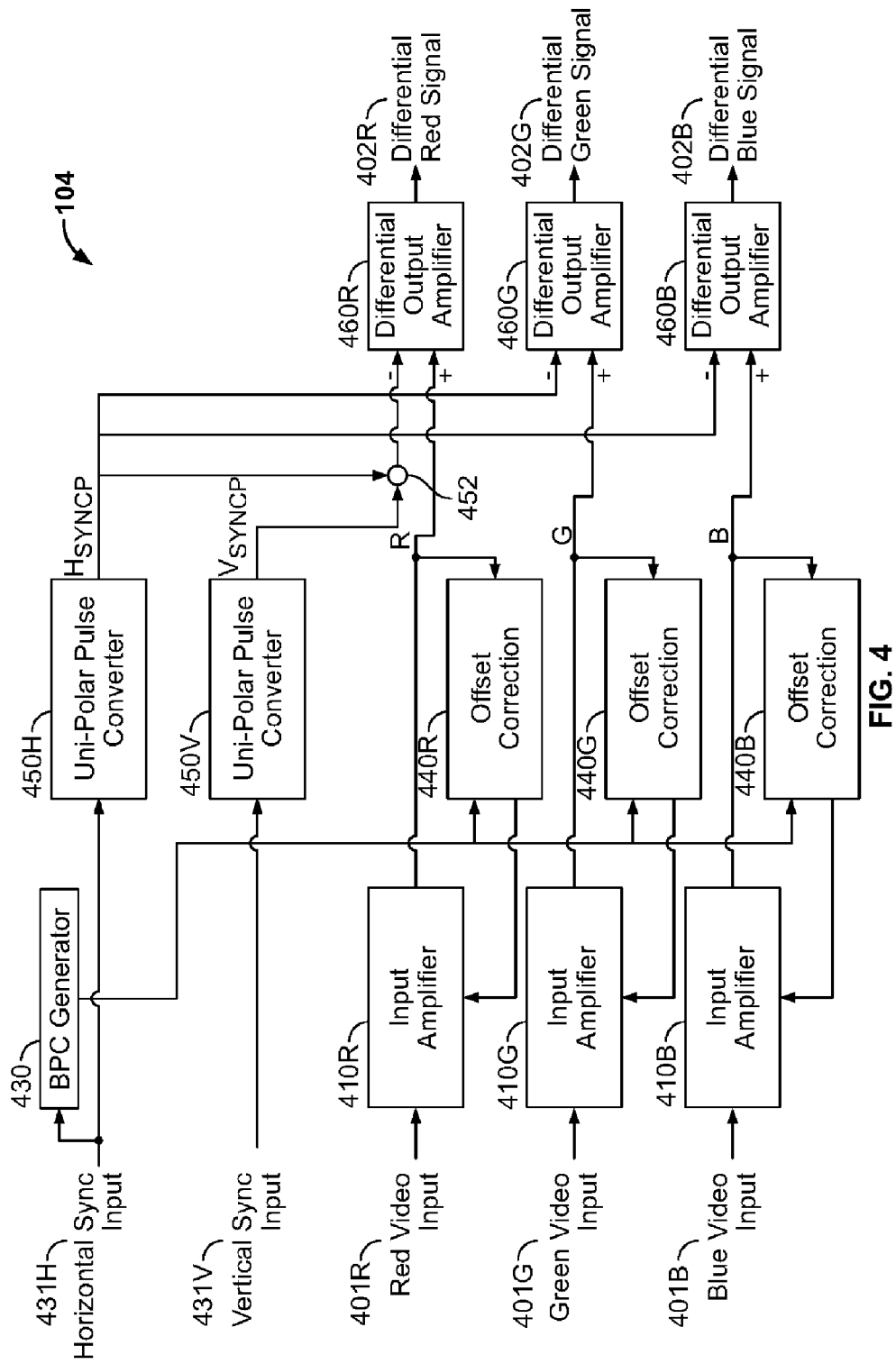
FIG. 4 is a block diagram illustration of architecture of transmitter 104 in accordance with an embodiment of the present invention.

FIG. 4 is a block diagram showing the architecture of transmitter 104 of FIG. 1 in an embodiment of the present invention. In the embodiment shown in FIG. 4, transmitter 104 receives a video source signal comprising separate video input signals and sync input signals. For example, if the video input source signal is in RGBHV format, the video input signals comprise the R, G and B signals, while the sync input signals comprise the H and V sync signals. In other embodiments, the sync signals may be combined with one or more of the video component signals.

In embodiments using video formats in which the sync information is combined with one or more of the video component signals (e.g. S-Video, Component video, or RGB video with a combined synchronization signal), the sync signals may be detected and extracted from one or more of the input video component signals and then re-combined with one or more of the video components to provide reference signals for signal compensation as well as providing sync information.

In the RGBHV embodiment of FIG. 4, transmitter 104 comprises horizontal and vertical sync input terminals 431H and 431V, red, green and blue video input terminals 401R, 401G and 401B, input amplifiers 410R, 410G, and 410B, back porch clamp (BPC) generator 430, offset correction circuits 440R, 440G, and 440B, uni-polar pulse converters 450H and 450V, differential output amplifiers 460R, 460G and 460B, and differential output terminals 402R, 402G and 402B. Transmitter 104 may also contain local output amplifiers for each input signal (not shown) that provide a local video monitor output signal.

Input amplifiers 410 receive the input video signal from video input terminals 401, and uni-polar pulse converters 450 receive the sync input signals from sync input terminals 431. In one or more embodiments, separate amplifiers are utilized for each video component signal. For example, in an embodiment for an RGBHV input signal, three input amplifiers 410 for the video components (one each for the R, G, and B components) and two uni-polar pulse converters 450 for the sync signals (one each for the H and V sync signals) are used.

Input amplifiers 410 are used in conjunction with horizontal sync BPC generator 430 and offset correction circuits 440 to detect and compensate for any DC offset in the source video signal. In the embodiment of FIG. 4, offset correction circuits 440 determine the DC offset for each video component using the back porch clamp signal from the BPC generator 430, and the amplified video source signal from input amplifiers 410. Offset correction circuits 440 apply compensation to each video component via a feedback loop comprising the respective input amplifier 410 for that component.

The vertical and horizontal synchronization signals 431H and 431V are coupled to uni-polar pulse converters 450. Uni-polar pulse converters 450 assure that sync signals output by transmitter 104 are always the same polarity regardless of the polarity of the input. An embodiment of a uni-polar pulse converter 450 is illustrated in FIG. 5.

Figure 5:
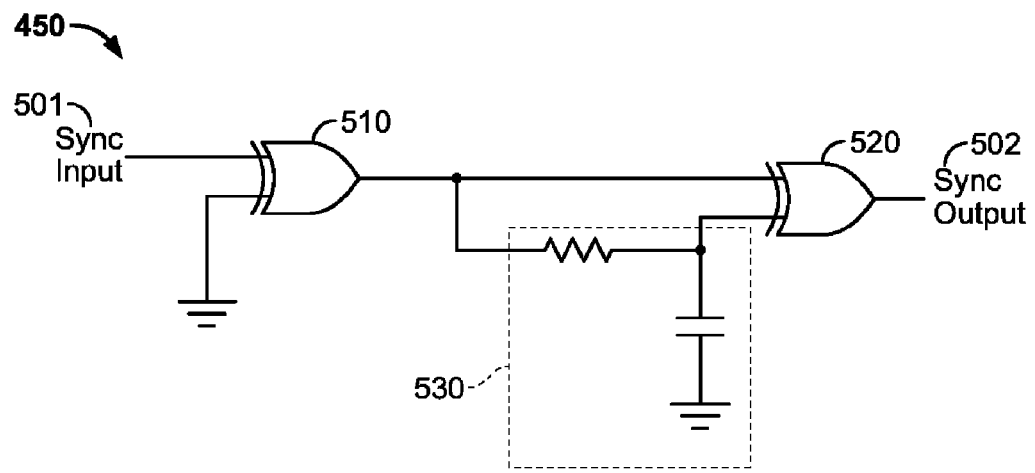
FIG. 5 is an illustration of a polarity converter in accordance with an embodiment of the present invention.

In the embodiment of FIG. 5, pulse converter 450 comprises two exclusive-OR gates (e.g. 510 and 520) that process the received sync input signal. Initially, the sync input signal 501 (e.g. 431H and 431V) is exclusive-ORed with ground in gate 510 and then the output of gate 510 is filtered in low-pass filter 530 (which in one or more embodiments comprise a resistor and capacitor circuit) and exclusive-ORed with itself (i.e. unfiltered output of gate 510) in gate 520 to generate the polarity-corrected sync output signal 502.

In one or more embodiments, the standardized horizontal sync signal (identified as "$H_{SYNCP}$" in FIG. 4) is used as both the horizontal sync signal and as the reference pulse signal. In these embodiments, $H_{SYNCP}$ is injected into each of the video signal components simultaneously. In addition, the vertical sync signal ("$V_{SYNCP}$" in FIG. 4) is added to one of the video components to convey the vertical sync information to the receiver.

In the embodiment of FIG. 4, the red video component signal is used to convey the vertical sync information. $H_{SYNCP}$ is summed with $V_{SYNCP}$ at node 452 and subtracted from the red video component signal (added to the negative input terminal) at differential amplifier 460R. $H_{SYNCP}$ is subtracted from the green video component at differential amplifier 460G; and $H_{SYNCP}$ is subtracted from the blue video component at differential amplifier 460B. In this way, a negative reference pulse is simultaneously added to all three differential video output signals.

Differential output amplifiers 460 receive the reference, sync (if applicable) and video signals and provide corresponding amplified differential driver signals to differential output terminals 402. In one or more embodiments, differential output terminals 402 comprise a female RJ-45 connector using pin assignments such as those shown in FIG. 2 (pins 3 and 6 may be used for transmission of power, digital signals, and/or audio signals). Differential output terminals 402 may be connected via twisted pair cable 106 of FIG. 1 to receiver 108.

Figure 6:
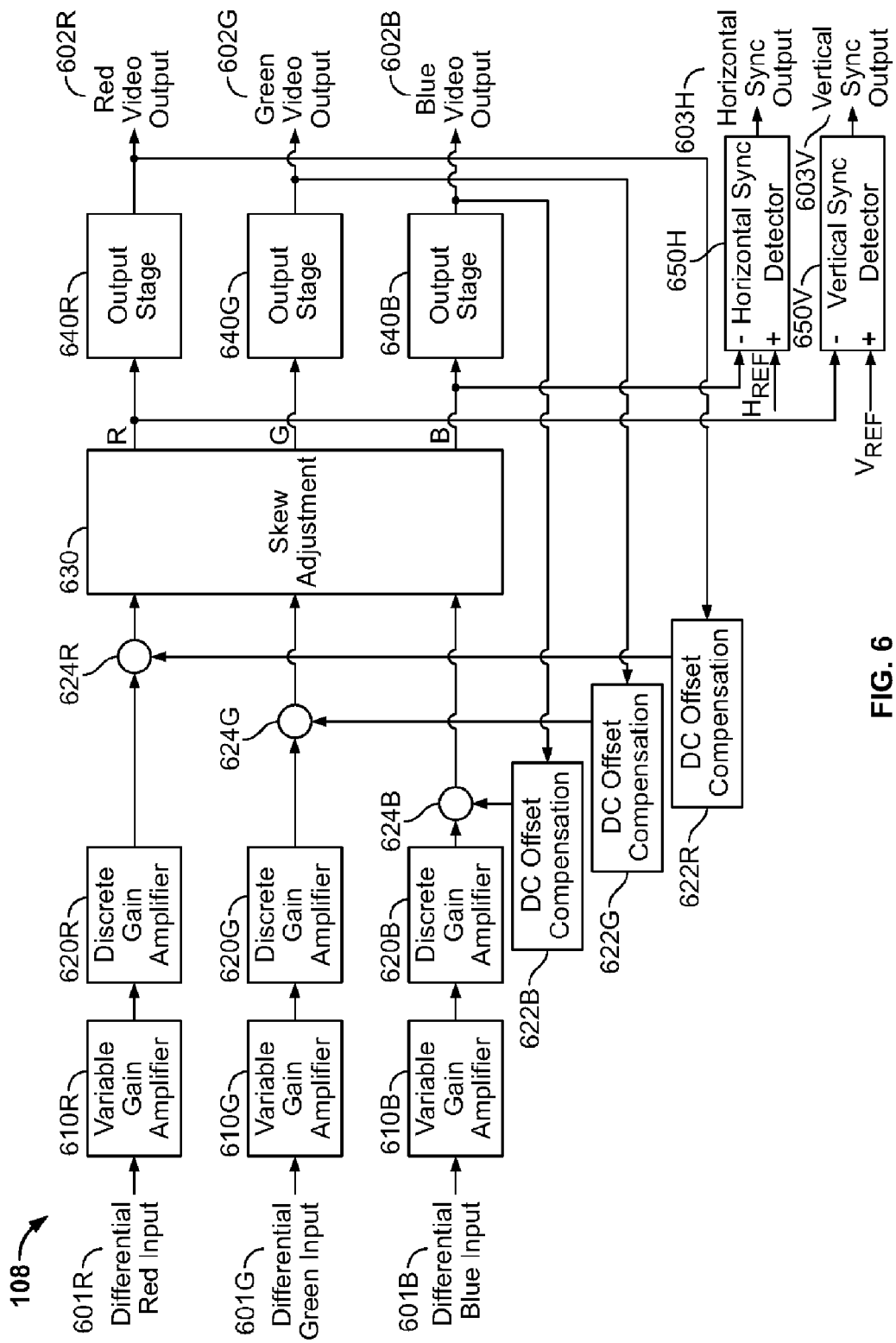
FIG. 6 is a block diagram illustration of architecture of Receiver 108 in accordance with an embodiment of the present invention.

Receiver 108 receives the differential video signals from transmitter 104 via twisted pair cable 106. Receiver 108 processes the differential video signals to compensate for insertion loss (and, in one or more embodiments, for skew) and outputs the compensated video signals to a destination device such as projector 110. FIG. 6 is a block diagram of receiver 108 in accordance with an embodiment of the present invention.

In the embodiment of FIG. 6, Receiver 108 comprises variable gain amplifiers 610R, 610G and 610B, discrete gain amplifiers 620R, 620G and 620B, skew adjustment circuit 630; output stages 640R, 640G and 640B, DC offset compensation circuits 622R, 622B and 622G, and sync detectors 650H and 650V. Receiver 108 may also include differential output terminals (not shown) that output a buffered and/or amplified version of the input signals for daisy chaining to other receivers.

The differential video input signals 601 (e.g. 601R, 601G and 601B) are coupled to the respective variable gain amplifiers 610 and discrete gain amplifiers 620. Each variable gain amplifier 610 works together with the corresponding discrete gain amplifier 620 to compensate a respective one of the differential input video signals for insertion losses resulting from communication of the signal from transmitter 104 to receiver 108 over twisted pair cable 106. In one or more embodiments, each variable gain amplifier 610 is capable of providing a controllable, variable amount of gain over a range from zero (0) to a maximum value (K), and each discrete gain amplifier 620 provides amplification in controllable, discrete multiples of K (e.g. 0K, 1K, 2K, etc). Together, variable gain amplifiers 610 and discrete gain amplifiers 620 provide controllable amounts of variable gain over an amplification range equal to the sum of the maximum gain of variable gain amplifiers 610 and the maximum gain of discrete gain amplifiers 620. In one or more embodiments, K represents the amount of gain typically required to compensate for signal losses over a known length of cable (e.g. 300 feet).

The total amount of gain provided by variable gain amplifiers 610 and discrete gain amplifiers 620 may be selected based on the length of cable 106, or may be automatically controlled. The amount of gain provided by variable gain amplifiers 610 and discrete gain amplifiers 620 may be controlled, for example, using a micro-controller that determines the appropriate amount of gain to be applied based on actual and expected signal strength of the reference signal included in the video signals received from transmitter 104, as is described in greater detail below.

Figure 8:
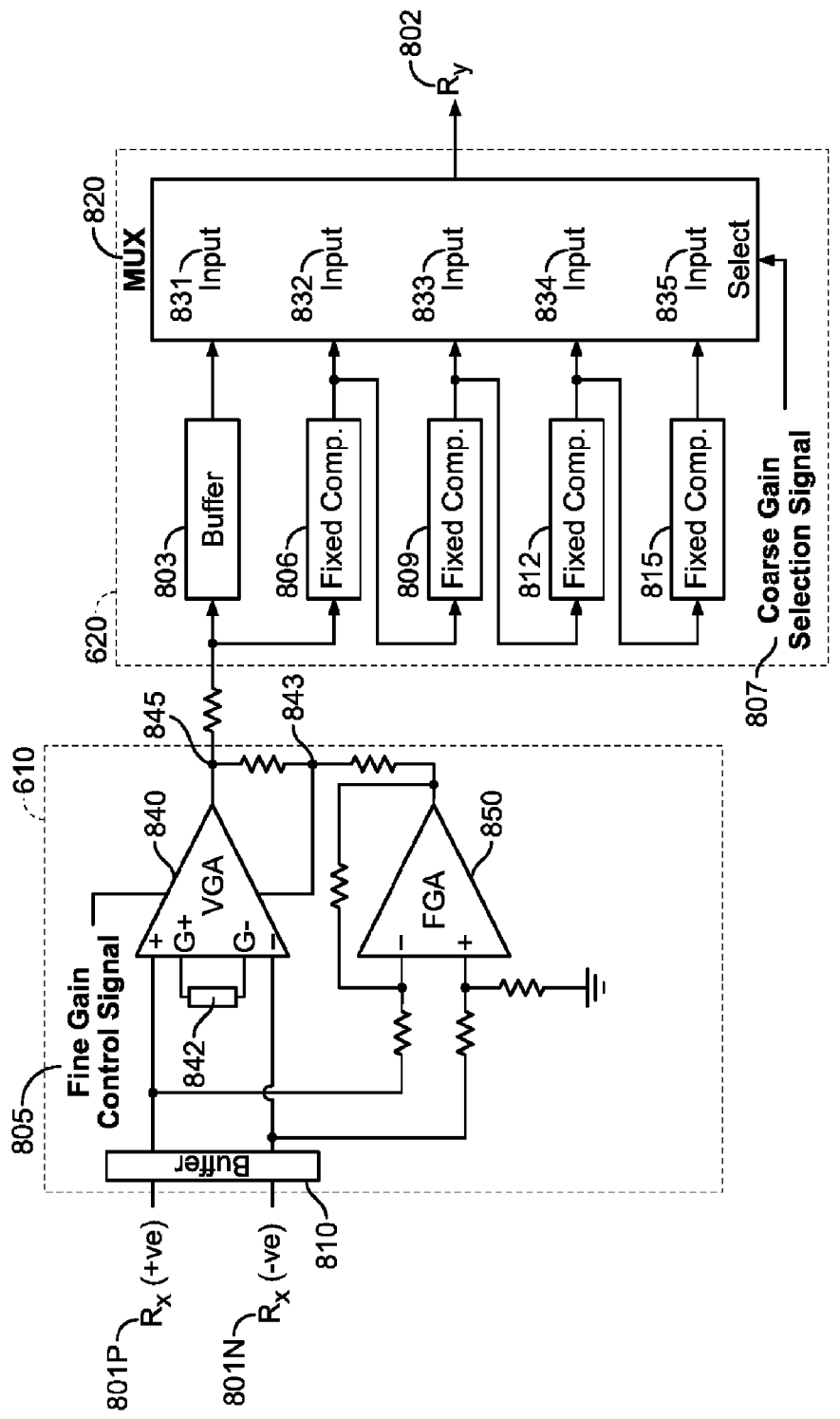
FIG. 8 is an illustration of a compensation circuit in accordance with an embodiment of the present invention.

FIG. 8 shows embodiments of a variable gain amplifier 610 and a discrete gain amplifier 620 in one embodiment of the invention. FIG. 8 shows a variable gain amplifier 610 and discrete gain amplifier 620 for a single video signal component, namely the red color component of an RGB signal (designated $R_x$ in FIG. 8). However, it will be understood that in one or more embodiments each color component is provided with its own variable gain amplifier 610 and discrete gain amplifier 620, as shown, for example, in FIG. 6.

In the embodiment of FIG. 8, variable gain amplifier 610 provides amplification over an initial amplification range of zero up to a maximum gain (represented herein by the letter "K"). Discrete gain amplifier 620 provides selectable, discrete amounts of gain in multiples of K. For example, in the embodiment of FIG. 8, discrete gain amplifier 620 provides selectable gain in the amounts of 0K, 1K, 2K, 3K or 4K. Together, variable gain amplifier 610 and discrete gain amplifier 620 provide continuously variable gain over the range from 0 to 5K.

In the embodiment of FIG. 8, variable gain amplifier 610 includes a fixed gain amplifier circuit (FGA) 850, a variable gain amplifier circuit (VGA) 840, and a compensation circuit 842. VGA 840 and FGA 850 are both coupled to the differential input signals $R_x$(+ve) 801P and $R_x$(−ve) 801N. The coupling may be via a differential line buffer, e.g. 810, to prevent unbalancing of the transmission line. FGA 850 converts the differential video input signal to a single ended output with fixed gain. VGA 840 adds a controllable amount of variable (DC and AC Compensation) gain to the differential video input signal. The outputs of FGA 850 and VGA 840 are summed at node 843. The resulting summed signal is provided to the input of discrete gain amplifier 620 from node 845.

Figure 9A:
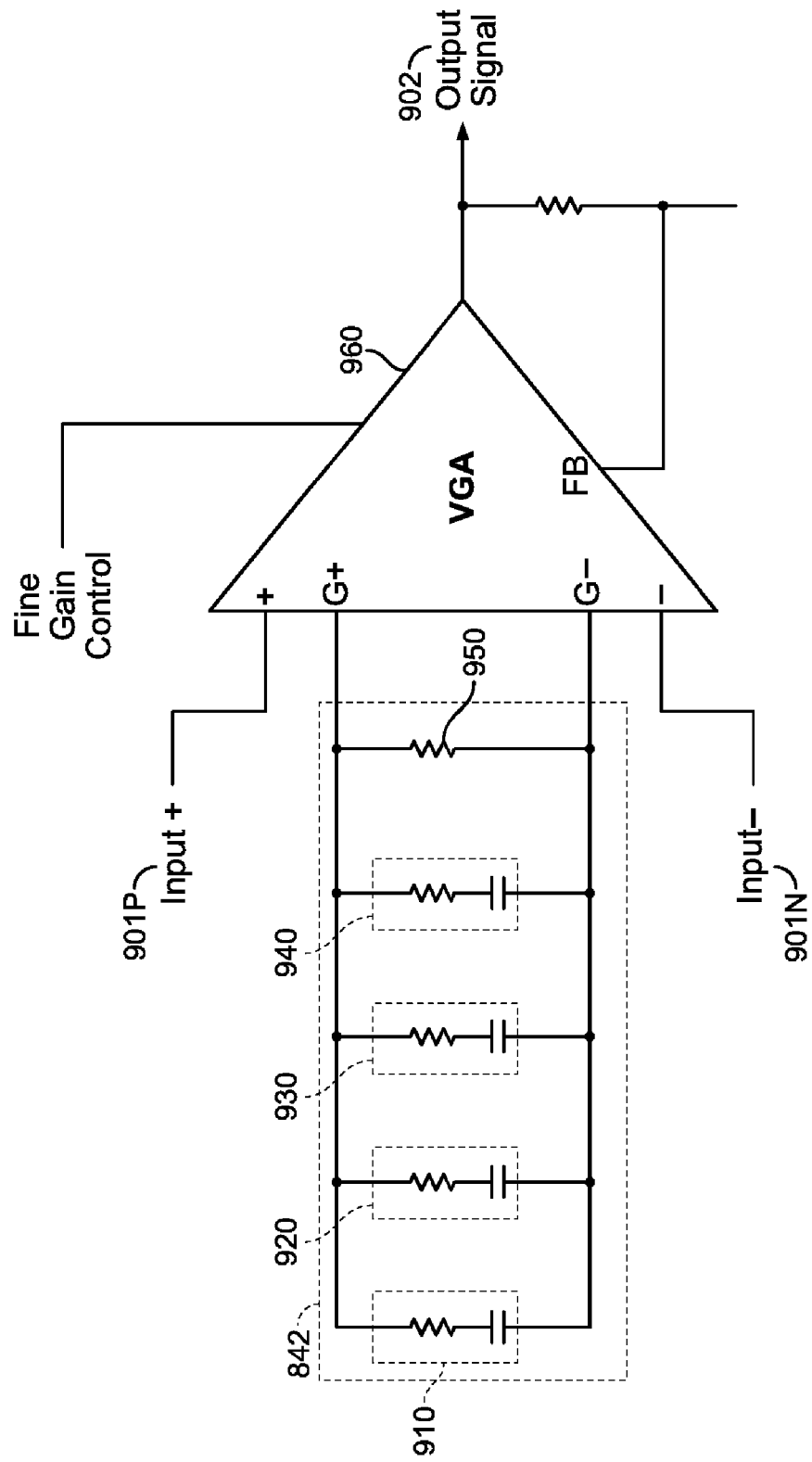
FIG. 9A is an illustration of a variable AC and DC compensation circuit in accordance with an embodiment of the present invention.

The amount of gain supplied by VGA 840 is controlled by Fine Gain Control Signal 805 supplied, for example, by a microcontroller. Compensator circuit 842 is used to set the desired frequency response of VGA 840. An embodiment of compensator circuit 842 is illustrated in FIG. 9A. The fine gain control of VGA 840 compensates for both DC and AC signal losses in cable lengths of 0 feet to N feet (e.g. 300 feet).

Figure 11:
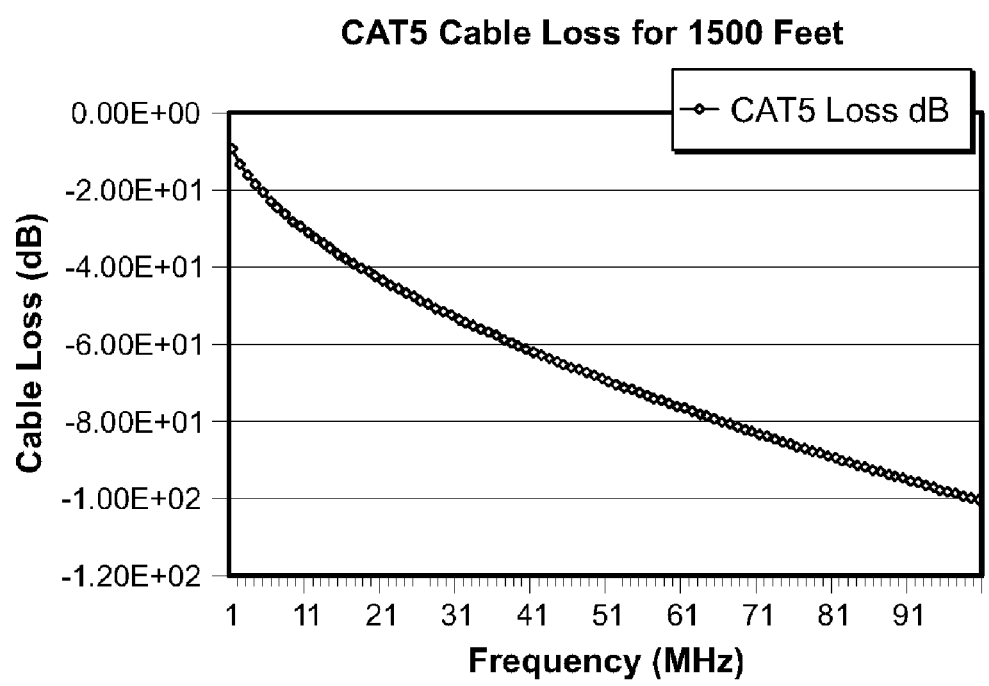
FIG. 11 is a frequency response plot of an example 1500 feet length CAT5 cable.

FIG. 9A shows an embodiment in which compensator circuit 842 is connected to voltage controlled amplifier 960. In the embodiment of FIG. 9A, compensator circuit 842 is connected to the gain setting inputs of the voltage controlled gain amplifier 960. Compensator circuit 842 comprises a gain setting resistor 950 and one or more series-connected resistor/capacitor pairs (i.e. 910, 920, 930, and 940) connected to the gain setting inputs of amplifier 960. Gain setting resistor 950 sets the DC gain compensation for the amplifier, while resistor/capacitor pairs 910-940 set the poles (AC gain), thereby shaping the transfer function of the amplifier circuit. Although four pole-setting resistor/capacitor pairs are used in the embodiment of FIG. 9, a greater or lesser number may be used depending on the shape of the transfer function desired. In one or more embodiments, the values of the resistors and capacitors are chosen such that the frequency response of the amplifier corresponds inversely to the frequency response of the cable over which the video signals are being transmitted, and such that the overall maximum dB gain (e.g. "K"), when the fine gain control is set to maximum, compensates for signal loss expected for a predetermined length of the type of cable used (e.g. 300 feet of CAT5 cable). The value (and frequency response) of "K" may be determined by measurement or may be estimated based on the known characteristics of the cable, such as, for example, the frequency response of CAT5 cable shown in FIG. 11.

Referring back to FIG. 8, if the maximum gain "K" provided by variable gain amplifier 610 corresponds to the insertion loss exhibited by 300 feet of CAT5 cable, then variable gain amplifier 610 can provide variable signal compensation corresponding to 0 to 300 feet of CAT5 cable. The amount of gain, between 0 and K (e.g. for between 0 and 300 foot lengths of CAT5 cable) provided by variable gain amplifier 610 is controlled by fine gain control signal 805 (described in greater detail below). For longer lengths of cable, additional signal amplification is required. In the embodiment of FIG. 8, that additional signal amplification is provided by discrete gain amplifier 620.

Discrete gain amplifier 620 provides additional compensation for longer line lengths in discrete amounts of "K". For example, for a cable length of 450 feet, 1.5K of total compensation is required. In this case, discrete gain amplifier 620 provides 1K (300 feet) of compensation, while variable gain amplifier 610 provides the remaining 0.5K (150 feet) of compensation.

Figure 9B:
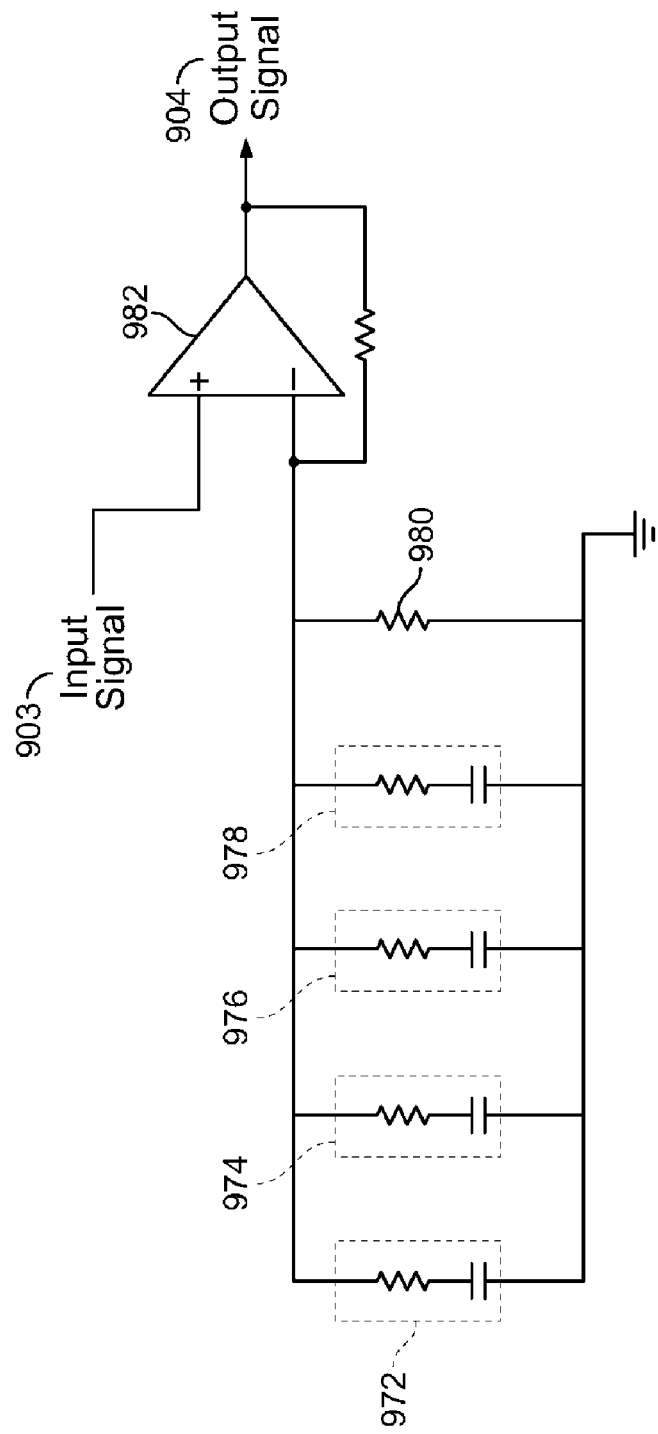
FIG. 9B is an illustration of a Fixed AC and DC compensation circuit in accordance with an embodiment of the present invention.

In the embodiment of FIG. 8, discrete gain amplifier 620 comprises a multiplexer 820, a zero-gain buffer 803, and a plurality of fixed gain compensation circuits 806, 809, 812 and 815. Each compensation circuit provides a fixed amount of gain (e.g. "K") that is approximately equal to the maximum amount of gain provided by a variable gain amplifier 610, and that has approximately the same frequency response. FIG. 9B shows the fixed compensation network encompassed in the fixed gain stages 806, 809, 812, and 815 of FIG. 8. The compensation network is placed in the feedback loop of amplifier 982. The fixed gain compensation network comprises a gain setting resistor 980 and one or more series-connected resistor/capacitor pairs (i.e. 972, 974, 976, and 978) connected in parallel between the inverting input of amplifier 982 and ground. Gain setting resistor 980 sets the fixed DC gain, while the resistor/capacitor pairs set the poles, thereby shaping the transfer function of the amplifier circuit for a fixed amount of gain compensation (e.g. "K"). The compensation circuits are daisy changed, and the output of each successive compensation circuit is connected to one of the inputs of multiplexer 820.

In one or more embodiments, the amplifier circuit of FIG. 9B is used for each of the compensation circuits 806, 809, 812 and 815.

In the embodiment of FIG. 8, input 831 of multiplexer 820 is connected to the output of buffer 803 (i.e. the buffered output signal from variable gain amplifier 610). Input 832 is connected to the output of compensation circuit 806 (i.e. the output signal from variable gain amplifier 610 after it has been amplified by compensation circuit 806). Input 833 is connected to the output of compensation circuit 809 (i.e. the output signal from variable gain amplifier 610 after having been amplified by compensation circuits 806 and 809). Input 834 is connected to the output of compensation circuit 812 (i.e. the output signal from variable gain amplifier 610 after having been amplified by compensation circuits 806, 809 and 812). Input 835 is connected to the output of compensation circuit 815 (i.e. the output signal from variable gain amplifier 610 after having been amplified by compensation circuits 806, 809, 812 and 815). If K is the amount of gain provided by each compensation circuit, then the additional gain applied to the output signal from variable gain amplifier 610 is 0K, 1K, 2K, 3K or 4K, depending on which of inputs 831, 832, 833, 834 or 835 is selected. If the amount of gain supplied by variable gain amplifier 610 is "J" (i.e. a value between 0 and K), the total amount of gain provided by variable gain amplifier 610 and discrete gain amplifier 620 is J, J+K, J+2K, J+3K or J+4K, depending on which of inputs 831, 832, 833, 834 or 835 is selected.

In the embodiment of FIG. 8, the fixed amount of compensation provided by each of compensation of circuits 806, 809, 812 and 815 is approximately equal to the maximum compensation provided by variable gain amplifier 610. However, it will be obvious to those of skill in the art that the amount of compensation provided by each of the compensation circuits 806, 809, 812 and 815 may be greater or less than the maximum provided by variable gain amplifier 610. Further, the discrete amount of compensation provided by each of compensation circuits 806, 809, 812 and 815 need not be the same.

The connection of either of inputs 831, 832, 833, 834 or 835 to output 802 of multiplexer 820 is controlled by coarse gain selection signal 807. In one or more embodiments, coarse gain selection signal 807 is generated by a microcontroller, which determines both the coarse gain selection signal 807 and the fine gain control signal 805 based on the actual loss in the reference signal as detected in the video signal received from the transmitter as described with respect to FIG. 10 below.

If "K" is the amount of compensation corresponding to the losses (in dB) exhibited by 300 feet of CAT5 cable, if maximum compensation provided by variable gain amplifier 610 is "K", and if each compensation circuit 806, 809, 812 and 815 provides a fixed amount "K" of compensation, then the embodiment of FIG. 8 provides variable compensation to compensate for insertion loss for video transmitted over between zero (0) and fifteen hundred (1500) feet of CAT5 cable.

Figure 10:
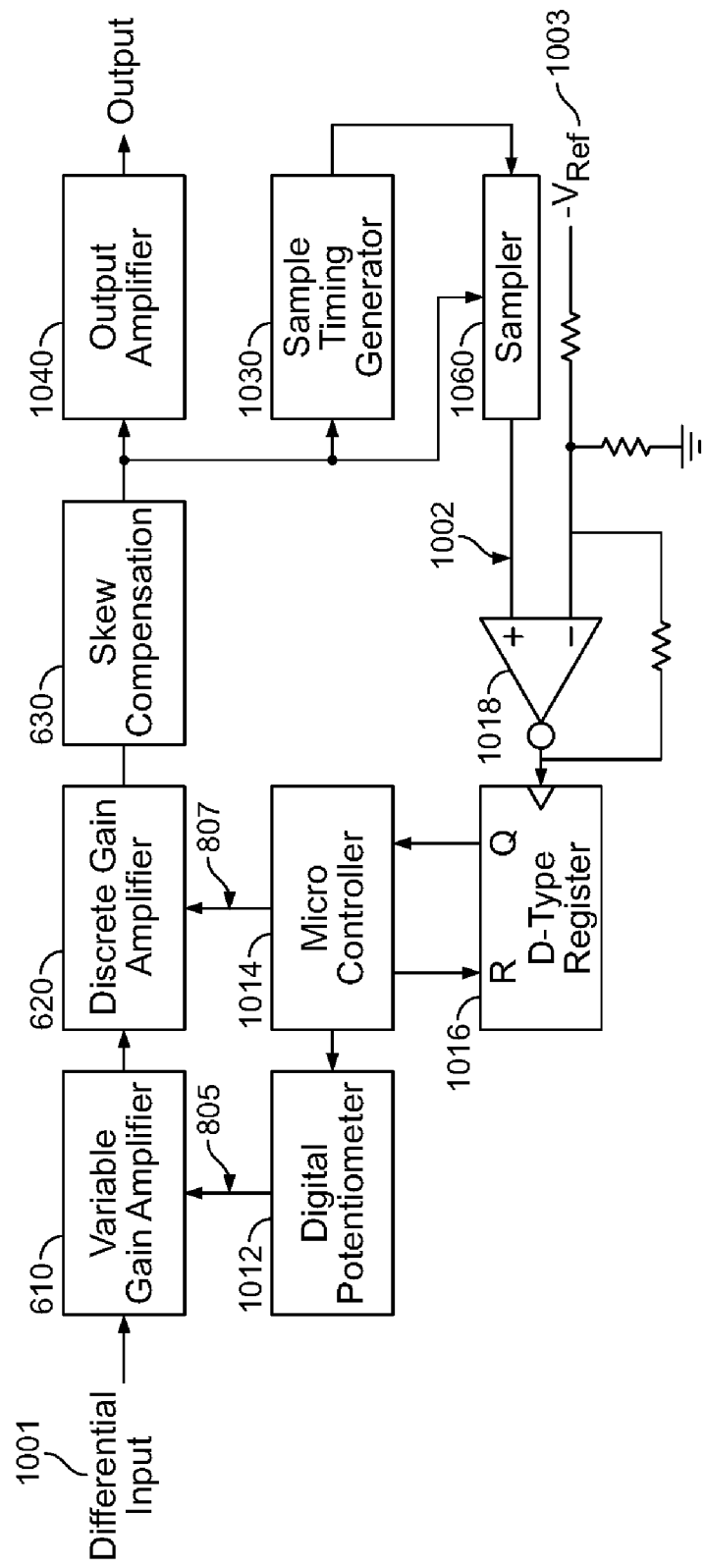
FIG. 10 is an illustration of circuit for determination of the fine and coarse gain selection signals in accordance with an embodiment of the present invention.

FIG. 10 shows a circuit for determination of the fine and coarse gain selection signals in accordance with an embodiment of the invention. Gain selection involves measuring the loss in the reference signal added by the transmitter to the video component signals transmitted to the receiver. In one or more embodiments, the loss exhibited by the reference signal in one of video component signals received by the receiver is determined, and the appropriate amount of compensation needed to restore the reference signal to its original level is calculated. That amount of compensation is then applied to all color component signals. In other embodiments, the amount of loss, and corresponding amount of compensation, may be separately determined for each video signal component.

In the embodiment of FIG. 10, level comparator 1018 is used in conjunction with sample timing generator 1030, sampler 1060, and microcontroller 1014 to determine the amount of compensation needed to restore the reference signal to the desired value. Sampler 1060 samples the reference signal at the receiver (sync reference pulse at input of Output Amplifier 1040) for a short duration (e.g. 50 ns) during the leading (falling) edge of the reference signal using gating information provided by sample Timing Generator 1030. Comparator 1018 receives the sampled signal 1002 at its positive input terminal, and compares it to a negative reference voltage level ($-V_{Ref}$) 1003 coupled to its negative input terminal. This comparison generates the differences for the DC level and AC step responses. The output of comparator 1018 is a TTL level signal that connects to the clock input of a D-type register 1016. Microcontroller 1014 resets D-type register 1016 and monitors the output (i.e. Q) of the register 1016. If the level of the output signal of comparator 1018 is sufficient, it will clock register 1016, indicating to microcontroller 1014 that the level of the reference signal is at or greater than the desired (approx. original) level. If the output of comparator 1018 is not sufficient to clock register 1016, microcontroller 1014 commands discrete gain amplifier 620 and variable gain amplifier 610 to provide an increased amount of compensation to the video component signal. If the output of comparator 1018 is sufficient to clock register 1016, in one or more embodiments, microcontroller 1014 commands discrete gain amplifier 620 and variable gain amplifier 610 to provide incrementally reduced amounts of compensation until the point is found where the output of comparator 1018 is just sufficient to clock register 1016.

In the embodiment of FIG. 10, microcontroller 1014 may use a software algorithm to determine the total amount of compensation to be applied, and then determine the number of compensation circuits to be used in discrete gain amplifier 620 and the amount of additional compensation to be supplied by variable gain amplifier 610 to obtain the desired total amount of compensation. Microcontroller sends a corresponding coarse gain selection signal 807 to discrete gain amplifier 620, and commands digital potentiometer 1012 to provide the corresponding fine gain control signal to variable gain amplifier 610. In one or more embodiments, microcontroller 1014 initially sets the gain to an initial level (which may be the maximum gain), and increases or decreases it until the reference signal is restored, which is indicated by comparator 1018 clocking the D-type register 1016. In one or more embodiments, the reference signal is continuously monitored to determine when signal compensation is required. Thus, if the cable over which the video signal is transmitted from the transmitter to the receiver is changed, switched or the insertion loss changes for any other reason, the insertion loss will be compensated for automatically.

Referring back to FIG. 6, after the video components are compensated for insertion loss, the video signals may be further compensated for skew using skew adjustment circuit 630, and for DC offset using DC Offset Compensation circuit 622.

In one or more embodiments, skew adjustment may be accomplished by detecting the reference signal in each video output component, determining the amount of skew delay among the video signal components, and determining the amount of delay to be applied to each component to eliminate any detected skew. An example skew adjustment circuit is described in co-pending U.S. patent application Ser. No. 11/309,120, entitled "Method And Apparatus For Automatic Compensation Of Skew In Video Transmitted Over Multiple Conductors", the specification of which is incorporated by reference herein.

DC offset compensation may be applied using circuit 622 (i.e. 622B, 622G or 622R) which comprises a feedback loop around the skew adjustment circuit 630 and output amplifiers 640. The DC offset compensation circuit 622 for each respective color component signal measures the signal offset (from ground) at the respective output of the video output amplifiers 640, and generates a corresponding correction signal, accounting for DC offset caused by the receiver's circuitry itself. In the embodiment of FIG. 6, each DC offset correction signal feeds back and sums at the respective summing node 624 with the respective gain compensated video signal component (from the respective discrete gain amplifier 620).

Figure 7:
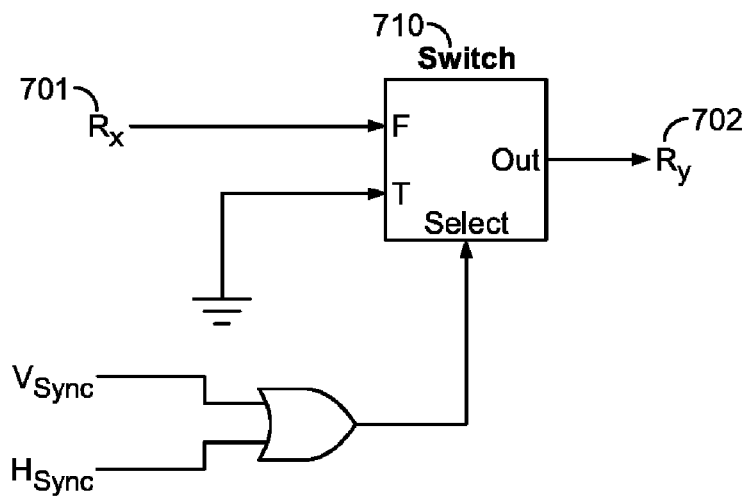
FIG. 7 is an illustration of a sync stripper circuit in accordance with an embodiment of the present invention.

Output signals 602R, 602G and 602B are generated by stripping appropriate reference and/or sync signals from the video signal components by respective output stages 640R, 640G and 640B. In one or more embodiments, an output stage 640 comprises a switch that grounds the video output during the sync period. When either the vertical sync (e.g. 603V) or the horizontal sync (e.g. 603H) pulse is high for any video component signal, the video output (i.e. 602) is switched to ground; otherwise, the video output is switched to the corresponding video signal output of skew adjustment circuit 630. An embodiment of a switch arrangement that is used in the present invention is illustrated in FIG. 7. In other non-RG-BHV video formats the sync signals may not be stripped and/or sync signals may be added to certain video components to re-constitute the video format being transmitted.

In FIG. 7, $R_x$ 701 is the video source from the output of skew adjustment circuit 630, and $R_y$ 702 is the stripped video output. The vertical sync strip signal (i.e. $V_{Sync}$) is OR'd with the horizontal sync strip signal (i.e. $H_{Sync}$) to generate the "Select" signal of switch 710. In one or more embodiments, the vertical and horizontal sync strip signals are provided to output stages 640 by circuitry that detects the sync signals from sync detectors 650H and 650V (shown in FIG. 6). When the Select signal is true ("T") the video output, $R_y$ 702, is coupled to ground through switch 710 to remove the sync pulse. Otherwise, i.e. when the Select signal is false ("F"), the video output $R_y$ 702 is coupled to the input signal, $R_x$ 701.

In the embodiment of FIG. 6, the sync pulses are detected by comparing the appropriate color component signal (e.g. the Red (i.e. $R_y$) component for the vertical sync signal and the Blue (i.e. $B_y$) component for the horizontal sync signal) at the corresponding output of skew adjustment circuit 630 against appropriate reference voltage levels. A comparator may be used for such comparison. Thus, in the embodiment of FIG. 6, the vertical sync signal is generated by vertical sync detector 650V when the $R_y$ output of skew adjustment circuit 630 meets the reference voltage threshold level, $V_{REF}$, and the horizontal sync signal is generated by horizontal sync detector 650H when the $B_y$ output of skew adjustment circuit 630 meets the reference voltage threshold level, $H_{REF}$.

Thus, a novel compensation method and system for automatic compensation of insertion loss in video transmitted over conductors has been described. It will be understood that the above described arrangements of apparatus and methods are merely illustrative of applications of the principles of this invention and many other embodiments and modifications may be made without departing from the spirit and scope of the invention as defined in the claims. For example, although example embodiments have been described for video signals that comprise three color components transmitted over twisted pair conductors, the invention can be used with any type of signal that is transmitted over any number or type of conductors, as will be understood by those of skill in the art.

The invention claimed is:

1. A method for automatic compensation of losses in a signal transmitted over conductors and received by a receiving apparatus comprising:
   receiving by said receiving apparatus of an input signal over a conductor, said input signal comprising a reference signal;
   generating by said receiving apparatus an output signal from said input signal by applying compensation to said input signal, wherein said applying said compensation comprises:
   applying an initial amount of compensation by compensation circuitry of said receiving apparatus, said compensation circuitry configured to produce a variable amount of compensation up to a maximum amount of compensation, wherein said initial amount of compensation comprises said maximum amount of compensation;
   measuring a current level of said reference signal in said output signal;
   comparing said current level of said reference signal to a first level; and
   adjusting an amount of compensation applied by said compensation circuitry to said input signal until said current level of said reference signal is approximately equal to said first level.

2. The method of claim 1, wherein said reference signal comprises a negative voltage pulse.

3. The method of claim 1, wherein said reference signal is injected into said input signal at a transmitting station prior to said input signal to being received by said receiving apparatus.

4. The method of claim 1, wherein said measuring of said current level of said reference signal comprises:
   sampling said output signal at a leading edge of said reference signal.

5. The method of claim 1, wherein said input signal comprises is a component of a multi-component signal.

6. The method of claim 1, wherein said input signal comprises a differential signal.

7. The method of claim 1, wherein said compensation circuitry comprises a plurality of fixed compensation circuits coupled to a variable compensation circuit.

8. The method of claim 7, wherein said step of adjusting said amount of compensation applied to said input signal by said compensation circuitry comprises:
   adjusting a compensation level of said variable compensation circuit; and
   selecting a number of said plurality of fixed compensation circuits.

9. The method of claim 8, wherein said variable compensation circuit is configured to provide a variable amount of compensation up to a first compensation level.

10. The method of claim 9, wherein each of said plurality of fixed compensation circuits is configured to provide a fixed amount of compensation approximately equal to said first compensation level.

11. An apparatus for compensating for losses in signals transmitted over conductors comprising:
    an input configured to receive an input signal comprising a reference signal transmitted over a conductor;
    a compensation circuit coupled to said input configured to generate an output signal by providing an amount of compensation up to a maximum amount of compensation to said input signal, wherein said compensation circuit is further configured to be controlled by one or more control signals; and
    a controller circuit configured to generate one or more of said control signals depending on a sampled value of said reference signal, said controller circuit configured to control said compensation circuit to provide said maximum amount of compensation to said input signal when said input signal is received at said input.

12. The apparatus of claim 11, wherein said reference signal comprises a negative voltage pulse.

13. The apparatus of claim 11, wherein said input signal comprises a video signal.

14. The apparatus of claim 11, wherein said controller circuit comprises:
    a comparator coupled to said output signal configured to generate a first signal when said sampled value is approximately equal to a first value; and
    a microcontroller coupled to said comparator and said compensation circuit, wherein said microcontroller is configured to generate said one or more of said control signals to drive said sampled value to approximately said first value.

15. The apparatus of claim 11, wherein said input signal comprises a component of a multi-component signal.

16. The apparatus of claim 11, wherein said input signal comprises a differential signal.

17. The apparatus of claim 11, wherein said compensation circuit comprises a plurality of fixed compensation circuits coupled to a variable compensation circuit.

18. The apparatus of claim 17, wherein said variable compensation circuit is configured to provide a variable amount of compensation up to a first compensation level.

19. The apparatus of claim 18, wherein each of said plurality of fixed compensation circuits is configured to provide a fixed amount of compensation approximately equal to said first compensation level.

20. The apparatus of claim 11 wherein said reference signal comprises a sync signal.

* * * * *